Figure 1:
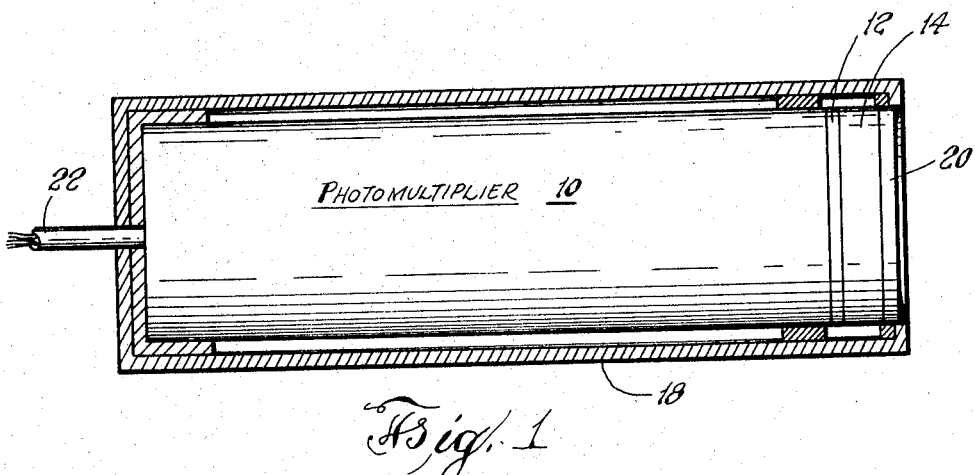

Jan. 17, 1967   C. CHRISTIANSON ET AL   3,299,267
IONIZING RADIATION DETECTOR AND MEASURING INSTRUMENT HAVING
A FLAT ENERGY RESPONSE OVER A WIDE ENERGY RANGE
Filed Jan. 21, 1964

INVENTORS.
CHARLES CHRISTIANSON
EDWARD F. DUFFY
LESTER MACKAY
ARTHUR RUTKOWSKI
BY Arthur L. Bowers
AGENT
Max N. [illegible]
ATTORNEY

United States Patent Office 3,299,267
Patented Jan. 17, 1967

3,299,267
IONIZING RADIATION DETECTOR AND MEASURING INSTRUMENT HAVING A FLAT ENERGY RESPONSE OVER A WIDE ENERGY RANGE
Charles Christianson, New York, Edward F. Duffy, Hewlett, Lester Mackay, Hollis, and Arthur Rutkowski, New York, N.Y., assignors to the United States of America as represented by the Secretary of the Navy
Filed Jan. 21, 1964, Ser. No. 339,309
3 Claims. (Cl. 250—71.5)

The invention described herein may be manufactured and used by or for the Government of the United States of America for governmental purposes without the payment of any royalties thereon or therefor.

This invention relates to measuring penetrating ionizing radiation more significantly relative to present day radiation safety standards. More particularly, this invention relates to measuring stray X-ray radiation emitted by high voltage, high power space discharge devices in electronic equipments.

Current health and safety standards relative to nuclear radiation exposure are expressed in terms that are independent of the energy, or energy distribution of the radiation. The safety standards go back to the basic concepts of maximum permissible dose. The Bureau of Standards has issued a booklet entitled Permissible Dose From External Source of Ionizing Radiation, Handbook 59, issued September 24, 1954, and has since issued addenda. This booklet is an authoritative treatment of this subject in detail. This booklet sets forth maximum permissible dose for various parts of the human body, and the whole body under a variety of conditions and for various categories of individuals. The safety standards expressed quantitatively in this booklet have been modified a number of times over the years on the basis of increased understanding and experience and it is likely that the safety standards will be modified further in the future. At present the maximum permissible dose is an average of 2.5 milliroentgens per hour for a 40-hour week. In all cases, the safety standards have been expressed in terms of average dose over a period of time and independent of the energy of the radiation. Therefore, instrumentation used for measuring radiation to which human beings may be exposed should register radiation independent of energy. For measuring X-ray radiation, the energy distribution of which is unknown, when the radiation is emitted by a high-voltage, high-power space discharge device, the measuring instrument should have a response characteristic as independent of energy as possible.

The permissible dose is defined as the amount of radiation which may be received by an individual within a specified period with expectation of no harmful result to himself. The permissible dose cited above is for more or less repeated exposures of the whole body as would be encountered in some employments. While no amount of radiation is safe since a gene mutation may be produced by a single ionizing event, complete isolation is impractical. Permissible dosages are established as low as possible to minimize risk of tissue damage but consistent with practical considerations and the requirements of society.

High voltage, high power space discharge devices apart from those in X-ray equipment have become increasingly more significant radiation hazards. X-ray radiation emitted by these devices is low-energy radiation for the most part, i.e., less than 100 kev. Actually, any electronic tube operating at more than 1000 volts is a potential source of X-ray radiation. Though the radiation may be soft, low energy, if the tube current is high the radiation intensity may be high. In most cases, the tube enclosure adequately attenuates the very soft X-ray radiation, namely radiation below 13 kev.

Personnel that install, operate, and repair equipments that include such devices may suffer biological damage from such radiation. However, there has not been available heretofore instrumentation that could measure such radiation satisfactorily. The designer and fabricator of such space discharge devices are hampered in their efforts to provide devices that are radiation safe over the full range of operating conditions by the lack of such instrumentation. Furthermore, a space discharge device that is safe initially may undergo changes in use which will be accompanied by increase in radiation to a degree that render it unsafe. There has not been available any satisfactory instrumentation for measuring the radiation accurately for ascertaining whether an unsafe condition exists.

A number of factors complicated the problem. Radiation emitted by a space discharge device not designed as a radiation source includes shielding but as the shielding becomes ineffective radiation is emitted as a narrow beam or beams and the directions of the beams cannot be predicted. The narrow beam is not readily detectable or measurable with accuracy. Also energy distribution of such radiation cannot be predicted and varies widely though most of the radiation is generally soft radiation. There has not been available any suitable instrument for field use to measure soft radiation.

Radar equipment, in particular, includes electronic tubes that operate at high kilovoltages and these tubes can emit harmful X-ray radiation if they are not adequately shielded. The quantity of X-ray radiation emitted by a radar tube is small if compared to lethal dosages of radiation but it can be adequate to cause cataracts or other serious organic injury. In most instances, the emitted radiation may be accompanied by radio frequency or microwave radiation which interferes with measurement of the penetrating ionizing radiation.

The X-ray radiation emitted by radar power tubes such as klystrons, magnetrons, and high-voltage thyratrons is pulsed, is of relatively high peak intensity, is characterized by heterogeneous energy, and for the most part, the energy is distributed in the low and intermediate energy range. Also the radiation emitted by electronic tubes is in the form of a narrow well-collimated beam or beams.

A radar transmits short-duration high-power microwave pulses. Most of the power tubes in the radar are pulse operated. Generally, it is during the on portion of the pulse cycle that a tube may emit X-ray radiation. Radiation emitted by the tube during the on portion of the pulse cycles may be on the order of thousands of roentgens per hour. During the longer off portion of a pulse cycle, little or no radiation is emitted by the tube. The X-ray radiation that is emitted by the pulsed high voltage tubes is normally in time coincidence with the microwave radiation. There are exceptions. For example, a high-voltage hydrogen thyratron may emit X-ray radiation during the non-conducting period of the tube and a klystron emits X-ray radiation when no RF is generated.

A Geiger-Mueller type detector is unsuitable for measuring low energy radiation because of its energy dependence below 100 kev. It is unsuitable for measuring high-intensity low energy pulsed radiation because it is not an integrating device, because it has relatively long resolving time which ranges from about 10 microseconds to above 50 microseconds and because it saturates at high peak intensities of X-ray radiation. Also, its range of linear response is far too low. Also, a Geiger-Mueller type detector is generally intended for high energy radiation fields. The principal data for determination of the radiation hazard is the average intensity of the X-ray radiation, not the peak intensity, and the radiation that is averaged must include the low energy radiation.

An ionization chamber dose rate meter type of instrument, though satisfactory for measuring low energy radiation, is unsuitable for the purpose described because of its sensitivity to radio frequency and microwave radiation and its comparatively low saturation level. An ionization chamber type of instrument is too fragile for field use by relatively unskilled personnel. Also where the radiation is emitted in a narrow beam, only a portion of the ionization chamber's volume is ionized by the beam but the ionization is averaged over its entire volume thereby providing an inaccurate reading.

Commercial and military radiac equipments heretofore available do not have significant response to X-ray or gamma radiation energy below 80 kev. This invention concerns measuring radiation of energies below 20 kev.

For pulsed radiation, the measuring instrument needs to be capable of resolving pulses of various duration times and repetition rates and needs to have a linear range several orders of magnitude greater than the range of instruments available heretofore for measuring only continuous type radiation.

An object of this invention is to provide an X-ray and gamma radiation detector that has linear response to ionizing radiation over a wide range of intensity and that is substantially independent of energy over a wide energy range.

A further object is to provide an X-ray and gamma radiation detector that will respond linearly to very high intensity short pulses of radiation without saturation.

A further object is to provide an X-ray and gamma radiation detector for a portable radiation assay instrument for use in measuring collimated intense radiation, which is approximately independent of energy over a very wide energy range, and which has essentially linear response over a very wide range of intensity.

A further object is to provide an improved X-ray and gamma radiation detector for use in conducting an ionizing radiation survey for detecting and for providing meaningful data useful in evaluating potential radiation hazard.

A further object is to provide an X-ray radiation detector for use in high power RF fields where the X-ray radiation is low-energy, high-intensity, short pulses in a narrow collimated beam.

A further object is to provide a radiation detector for use in measuring radiation emitted by the power tubes of radar equipments.

Other objects and advantages will appear from the following description of an example of the invention, and the novel features will be particularly pointed out in the appended claims.

Figure 2:
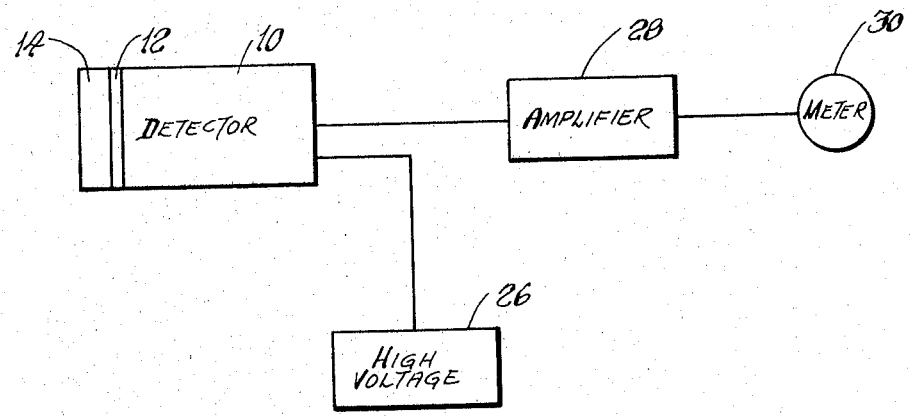

FIG. 1 is a view partly in section and partly in elevation of a detector according to this invention, and FIG. 2 is a block diagram of the circuit used in tests on the detector shown in FIG. 1.

The terms luminophore, phosphor scintillant, and phosphor used in this application identify materials which convert intercepted ionizing radiation specifically X-ray and gamma radiation into energy to which a photomultiplier responds.

In FIG. 1, there is shown a head-on photomultiplier 10, that senses luminous flux through its end face, a luminophore 12 optically coupled to the end face of the photomultiplier 10 with optical silicone grease e.g., type QC-2-0057 marketed by Dow-Corning or its functional equivalent and a second luminophore 14 similarly optically coupled to the other face of luminophore 12. The diameters of the luminophores and the end face of the photomultiplier are approximately equal and the three elements are coaxial. The response of the luminophore combination is relatively energy independent over a wide energy range. The luminophor 12 manifests more pronounced response to higher energy X-ray radiation than the luminophore 14. Their order relative to the photomultiplier cannot be reversed else the lower energy X-ray radiation would be substantially attenuated before reaching the luminophore 14.

The luminophore 12 is a commercial material identified as Pilot Scintillator B marketed in sheet form by Pilot Chemicals, Inc., 36 Pleasant St., Watertown 72, Mass. Bulletin 611, entitled Scintillation Grade Fluors Plastic Scintillators, issued by Pilot Chemicals, January 1961, states that Pilot Scintillator B contains diphenylstilbene and also includes the statement "This material, developed and patented by our laboratories" and identifies U.S. Patent 2,710,284. The luminophore 12 is Pilot Scintillator B, 50 millimeters thick, without modification. Pilot Scintillator B is easy to machine to the diameter desired. Its response to X-ray and gamma radiation above 100 kev. is essentially independent of energy.

Phosphor 14 is a dispersion of pulverized silver-activated zinc sulphide in a matrix of clear Lucite in the form of a disk of the same diameter as phosphor 12. Best results have been obtained from the invention where phosphor 14 consists essentially of 3.500 grams of Lucite and 0.004 gram of silver-activated zinc sulphide.

To fabricate the phosphor 14 we purchased Lucite transparent molding powder from Fischer Scientific Co., Fairlawn, New Jersey, and silver-activated zinc sulphide from A. D. Mackay, Inc., 198 Broadway, New York, New York. Using a laborator balance accurate to .0001 gram, we weighed out 0.0043 gram of the silver activated zinc sulphide and 3.5000 grams of Lucite and combined the two materials in a steel container on the order of three inches diameter and about one inch deep, added several steel ball bearings on the order of one-half inch diameter to the container, tightly closed the container, and vigorously shook the steel container for about five minutes to pulverize and thoroughly mix the materials. We opened the container, carefully separated the steel balls from the pulverized material and removed them from the container. Then we transferred all the pulverized material from the steel container to a 1¼ inch mold in a No. 1330 AB Speed Press marketed by Buehler Ltd., Metallurgical Apparatus, 2120 Greenwood at Hartrey Ave., Evanston, Illinois, which is a specimen molding press selectively adjustable in temperature and pressure. After making a considerable number of disks at various combinations of temperatures and pressures, we ascertained by visible inspection of the surface finish, uniformity, and clarity of the product, that the best product was obtained from the pulverized material in the mold by applying an initial pressure of approximately 100 pounds per square inch to the pulverized material to compact the material and then setting the temperature for 180° C. A time interval of about 15–20 minutes elapsed before the temperature of the mold reached 180° C. Then we separated the heat source from the mold and substituted a heat sink and raised the pressure on the sample to 4200 p.s.i. and maintained that pressure until the temperature of the sample dropped to 80° F. Then we opened the mold and removed the disk.

A 6199 tube is preferred for photomultiplier 10. The quality of the light output from the phosphor scintillators 12 and 14 is such that the photomultiplier should have an S–11 spectral response photocathode; a 6199 has an S–11 spectral response photocathode. High gain is required; a 6199 has a gain of $10^6$ at 1200 volts. For a portable instrument probe for use in measuring X-ray and gamma radiation a handy size is required and where the radiation is in narrow collimated beams, a small diameter is required; a 6199 satisfies both these requirements.

We used a Westinghouse X-ray apparatus rated for 250 kv. to supply the X-ray and gamma energy range for obtaining the response of the combination of photomultiplier 10, and luminophors 12 and 14. Each of these sources were calibrated. As a standard we used a Condenser-R meter made by Victoreen, calibrated by the Bureau of Standards; this meter is an air ionization chamber. We mounted the Condenser-R meter on a test chamber at a given distance from, and in the path of a collimated X-ray beam of the X-ray apparatus to intercept the radiation. We selected a radiation intensity at the test position of 100 milliroentgens per hour. Using techniques and calculations described in literature issued by the Bureau of Standards we determined the voltage, current, filter combinations for providing each of several spaced apart levels of effective energies at the test position, namely, 13, 19, 28, 44, 63, 95, 144, and 206 kev. respectively.

The combination of photomultiplier 10 and luminophores 12 and 14 is enclosed in a light-tight housing having a beryllium window 20 on the order of 0.005 inch in thickness and of approximately the same diameter as the luminophores for transmitting X-ray and gamma radiation to the detector. The window transmits at least 90% of all the incident X-ray and gamma radiation of 5 kev. or more. A conductor cable 22 extends through the opposite end of the housing to the photomultiplier.

We took response data on several combinations of thicknesses of the luminophores 12 and 14 in the assembly shown in FIG. 1. We found that the luminophore 12 of Pilot B should be 50 millimeters thick for adequate response to the higher energies. The following compositions of luminophore 14 were tested in combination with 50 millimeter thickness of Pilot B; all of the luminophores 14 were fabricated in the same manner described previously. Tests were carried out under identical conditions at a radiation intensity of 100 milliroentgens per hour.

Example A—0.0043 gram of silver activated zinc sulphide; 3.5000 grams of Lucite.

Example B—0.0042 gram of silver activated zinc sulphide; 3.5000 grams of Lucite.

Example C—0.0042 gram of silver activated zinc sulphide; 3.5000 grams of Lucite.

| Kev. | Ex. A | Ex. B | Ex. C |
|------|-------|-------|-------|
| 206  | 77    | 74    | 68    |
| 144  | 75    | 71    | 66    |
| 95   | 62    | 57    | 54    |
| 63   | 58    | 52    | 51    |
| 44   | 69    | 60    | 60    |
| 28   | 80    | 68    | 69    |
| 19   | 70    | 59    | 60    |
| 13   | 56    | 47    | 48    |

Data was taken with a circuit as in FIG. 2, including photomultiplier 10, a high voltage source 26 and an amplifier 28 connected to the photomultiplier, and a meter 30 connected to the amplifier. The circuit in FIG. 2 was the same for the three tests. The results obtained proved that the detector described was far superior to detectors available heretofore for measuring low and intermediate energy range ionizing radiation.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:
1. A luminophore for a scintillation type radiation instrument comprising:
   (a) disk-shaped Pilot Scintillator B, 50 millimeters thick and one and one-quarter inch diameter,
   (b) a dispersion of .0043 gram silver activated zinc sulphide in 3.5000 grams of Lucite in the form of a transparent disk one and one-quarter inch diameter, and
   (c) silicone grease optically coupling said disks in-line face-to-face.
2. An X-ray and gamma radiation detector having approximately flat energy response over a wide energy range comprising:
   (a) a 6199 photomultiplier,
   (b) a first luminophore disk of Pilot Scintillator B one and one-quarter inch diameter and 50 millimeters thick optically coupled to the sensing end face of the photomultiplier, and
   (c) a second luminophore disk of one and one-quarter inch diameter consisting essentially of 0.0043 gram silver activated zinc sulphide dispersed in 3.5000 grams of Lucite optically coupled to the first luminophore disk.
3. A radiation measuring instrument comprising:
   (a) a 6199 photomultiplier,
   (b) a luminophore optically coupled face-to-face to the sensing end face of the photomultiplier,
   (c) a power supply for energizing the photomultiplier,
   (d) an amplifier coupled to the output of the photomultiplier, and
   (e) a meter coupled to the output of the amplifier,
   (f) said luminophore disk being a sandwich of two one and one-quarter inch disks, one of which is a dispersion of .0043 gram silver activated zinc sulphide in 3.5000 grams of Lucite and the other disk being Pilot Scintillator B 50 millimeters thick,
   (g) the disk of Pilot Scintillator B being disposed between the photomultiplier and the disk of silver activated zinc sulphide in Lucite.

References Cited by the Examiner
UNITED STATES PATENTS

| | | | |
|---|---|---|---|
| 2,727,154 | 12/1955 | Goldsworthy | 250—71.5 |
| 3,184,597 | 5/1965 | Scherbatskoy | 250—71.5 |

RALPH G. NILSON, *Primary Examiner.*

WALTER STOLWEIN, *Examiner.*

S. ELBAUM, *Assistant Examiner.*